US011300189B2

(12) United States Patent
Oda

(10) Patent No.: US 11,300,189 B2
(45) Date of Patent: Apr. 12, 2022

(54) DIFFERENTIAL DEVICE

(71) Applicant: MUSASHI SEIMITSU INDUSTRY CO., LTD., Toyohashi (JP)

(72) Inventor: Hirohisa Oda, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/958,495

(22) PCT Filed: Jan. 17, 2019

(86) PCT No.: PCT/JP2019/001237
§ 371 (c)(1),
(2) Date: Jun. 26, 2020

(87) PCT Pub. No.: WO2019/142855
PCT Pub. Date: Jul. 25, 2019

(65) Prior Publication Data
US 2021/0062904 A1 Mar. 4, 2021

(30) Foreign Application Priority Data
Jan. 18, 2018 (JP) .............................. JP2018-006731

(51) Int. Cl.
*F16H 48/40* (2012.01)
*F16H 48/08* (2006.01)
*F16H 48/38* (2012.01)

(52) U.S. Cl.
CPC ............. *F16H 48/40* (2013.01); *F16H 48/08* (2013.01); *F16H 2048/385* (2013.01)

(58) Field of Classification Search
CPC .................... F16H 48/08–2048/087; F16H 48/38–2048/426
See application file for complete search history.

(56) References Cited

U.S. PATENT DOCUMENTS 3,742,784 A * 7/1973 Engle ..................... F16H 48/22
475/160
4,543,853 A 10/1985 von Hiddessen et al.
(Continued)

FOREIGN PATENT DOCUMENTS

| JP | 2002-147580 A | 5/2002 |
| JP | 2005-214347 A | 8/2005 |

(Continued)

*Primary Examiner* — Ernesto A Suarez
*Assistant Examiner* — James J Taylor, II
(74) *Attorney, Agent, or Firm* — Carrier Blackman & Associates, P.C.; William D. Blackman; Joseph P. Carrier

(57) ABSTRACT

In a differential device in which a working window is provided in a case main body of a differential case that can rotate around a first axis, when viewed on the projection plane, orthogonal to the first axis, among joining parts between a flange portion of the differential case and a ring gear, a specific joining part that is the closest to the working window is positioned further outward than an inner end part of the working window in a direction along a third axis orthogonal to the first axis and a pinion axis, and the working window is positioned further outward, in the direction along the third axis, than an imaginary straight line joining the specific joining part and the first axis. Accordingly, rigidity strength of the differential case is enhanced and concentration of stress is prevented from occurring in the working window of the case main body.

8 Claims, 7 Drawing Sheets

(56) References Cited

U.S. PATENT DOCUMENTS

| | | |
|---|---|---|
| 7,827,882 B2 | 11/2010 | Kohno et al. |
| 9,285,026 B2 | 3/2016 | Shimosaka et al. |
| 9,476,493 B2 * | 10/2016 | Yanase ................... B23K 31/02 |
| 10,473,204 B2 * | 11/2019 | Shentu ................ F16H 37/0813 |
| 10,663,055 B2 * | 5/2020 | Nakamura .............. F16H 48/40 |
| 2012/0244986 A1 | 9/2012 | Masui |
| 2015/0362055 A1 * | 12/2015 | Biermann ............... F16H 48/40 |
| | | 475/230 |
| 2019/0056020 A1 * | 2/2019 | Ono ...................... F16H 57/023 |

FOREIGN PATENT DOCUMENTS

| | | |
|---|---|---|
| JP | 2009-287768 A | 12/2009 |
| JP | 2011-158045 A | 8/2011 |
| JP | 4902727 B2 | 3/2012 |

* cited by examiner

DIFFERENTIAL DEVICE

TECHNICAL FIELD

The present invention relates to a differential device and, in particular, a differential device that includes a differential case having that has a hollow case main body and a flange portion projectingly provided integrally with an outer periphery of the case main body and can rotate around a first axis, a differential mechanism that is housed within the case main body, a working window that is provided in the case main body, and a ring gear that transmits power from a drive gear connected to a power source to the differential case by meshing with the drive gear, the ring gear having a tooth part that receives a thrust load in a direction along the first axis due to meshing with the drive gear.

BACKGROUND ART

Such a differential device is already known from Patent Document 1 below.

PRIOR ART DOCUMENTS

Patent Documents

Patent Document 1: Japanese Patent No. 4902727

SUMMARY OF THE INVENTION

Problems to be Solved by the Invention

In a differential case of the differential device disclosed in Patent Document 1, two large working windows are formed in a case main body, and a ring gear is joined to a flange part projectingly provided on the outer periphery of a narrow part of the case main body sandwiched between the two working windows. Because of this, whereas simplification of a joining part and lightening of the weight of the differential case can be achieved, the length of a gap between the joining parts sandwiching the working windows in the peripheral direction (that is, the span via which a portion, corresponding to the working window, of the ring gear is supported on the differential case) becomes too long. However, since a non-joining part has low rigidity compared with the joining part, there is a possibility that the rigidity toward a thrust load transmitted from a drive gear to the ring gear during transmission (that is, a load in the collapse direction that is received by the ring gear) will become insufficient, and there is the problem that the rigidity balance of the differential case toward collapse of the ring gear will become difficult to achieve.

The present invention has been accomplished in light of the above circumstances, and it is an object thereof to provide a differential device that can solve the problems of the conventional device with a simple structure and can prevent effectively a concentration of stress from occurring in a peripheral part of a working window of a case main body due to the above thrust load.

Means for Solving the Problems

In order to attain the above object, according to a first aspect of the present invention, there is provided a differential device comprising a differential case that has a hollow case main body and a flange portion projectingly provided integrally with an outer periphery of the case main body and can rotate around a first axis, a differential mechanism that is housed within the case main body, a working window that is provided in the case main body, and a ring gear that is joined to the flange portion in order to transmit power from a drive gear connected to a power source to the differential case by meshing with the drive gear, the differential mechanism having a pinion shaft that is disposed on a second axis orthogonal to the first axis and is supported on the differential case or the ring gear, a pinion gear that is rotatably supported on the pinion shaft, and a pair of side gears that mesh with the pinion gear and are supported on the case main body to be rotatable around the first axis, the ring gear having a tooth part that receives a thrust load in a direction along the first axis due to meshing with the drive gear, and the working window being disposed on one side or on both sides of the second axis when viewed on a projection plane orthogonal to the first axis, characterized in that when viewed on the projection plane, among joining parts between the flange portion and the ring gear, a specific joining part that is the closest to the working window is positioned further outward than an inner end part of the working window in a direction along a third axis orthogonal to the first and second axes, and the working window is positioned further outward, in the direction along the third axis, than an imaginary straight line joining the specific joining part and the first axis.

Further, according to a second aspect of the present invention, in addition to the first aspect, the working window extends to the outer peripheral end of the case main body in the direction along the third axis or a part in a vicinity thereof, and the flange portion is discontinued in the peripheral direction of the differential case at a position corresponding to an outer end part, in the direction along the third axis, of the working window.

Furthermore, according to a third aspect of the present invention, in addition to the first or second aspect, when viewed along the first axis, the working window is formed so that an outer window portion close to the outer end part in the direction along the third axis is narrower in a direction along the second axis than an inner window portion further inward than the outer window portion.

Moreover, according to a fourth aspect of the present invention, in addition to any one of the first to third aspects, when viewed along the first axis, the specific joining part is disposed on a bisector of a region, sandwiched between the second axis and the third axis, of the differential case or closer to the third axis than the bisector.

In the present invention and the present specification, the 'working window' means a window for use in working that is formed in a case main body for the purpose of incorporating into the case main body a constituent gear of a differential mechanism (that is, a side gear and a pinion gear) or for the purpose of enabling an inner face of the case main body to be machined.

Effects of the Invention

In accordance with the first aspect of the present invention, in the differential device in which the working window is provided in the case main body of the differential case, since when viewed in a direction along the first axis, among the parts providing a join between the flange portion and the ring gear of the differential case, the specific joining part which is the closest to the working window is positioned further outward than an inner end part of the working window in the direction along the third axis orthogonal to the first and second axes, it is possible, by disposing the specific joining part as close to the outside as possible with respect to the inner end position of the working window, to make the gap between the specific joining parts sandwiching the working window in the peripheral direction (that is, the span via which a portion, corresponding to the working window, of the ring gear is supported on the differential case) relatively short. It is thereby possible to ensure the rigidity against the thrust load transmitted from the drive gear to the ring gear (that is, a load in the collapse direction that the ring gear receives) during transmission, and the rigidity balance of the differential case against collapse of the ring gear can easily be maintained.

Moreover, since when viewed on the projection plane the working window is positioned further outward in the direction along the third axis than the imaginary straight line joining the specific joining part and the first axis, and when during transmission the thrust load is transmitted to the large diameter part of the case main body via the specific joining part and the flange part and further transmitted to the small diameter part side, the load transmission path becomes a path that does not bypass the working window, this enables the occurrence of a concentration of stress on the peripheral part of the working window of the case main body to be avoided effectively, and it is advantageous in terms of enhancing the rigidity strength of the differential case.

Furthermore, in accordance with the second aspect, the working window extends up to the outer peripheral end of the case main body or a part in the vicinity thereof in a direction along the third axis, and the flange portion is discontinued in the peripheral direction of the differential case at a position corresponding to the outer end part, in the direction along the third axis, of the working window, and it is therefore advantageous in terms of lightening the weight of the differential case. Also due to such lightening of the weight, any degradation of the rigidity strength of the differential case can be minimized by a unique arrangement of the specific joining part with respect to the working window.

Moreover, in accordance with the third aspect, since the working window is formed so that when viewed on the projection plane the outer window portion close to the outer end part in the direction along the third axis is narrower in the direction along the second axis than the inner window portion further on the inner side than the outer window portion, it is possible to extend a region of the flange portion supported by the case main body in the peripheral direction of the case while ensuring a wide opening area of the working window (and therefore ensuring the ease of working through the working window). This enables the rigidity via which the flange portion is supported by the case main body to be enhanced, and it therefore becomes possible to suppress effectively collapse of the ring gear when a thrust load is applied thereto.

Furthermore, in accordance with the fourth aspect, since when viewed on the projection plane, the specific joining part is disposed on the bisector of the region, sandwiched between the second axis and the third axis, of the differential case or closer to the third axis than the bisector, the gap between the specific joining parts sandwiching the working window in the peripheral direction, that is, the support span, can be sufficiently shortened, and collapse of the ring gear when a thrust load is applied thereto can thus be suppressed more effectively.

EXPLANATION OF REFERENCE NUMERALS AND SYMBOLS

Figure 1:
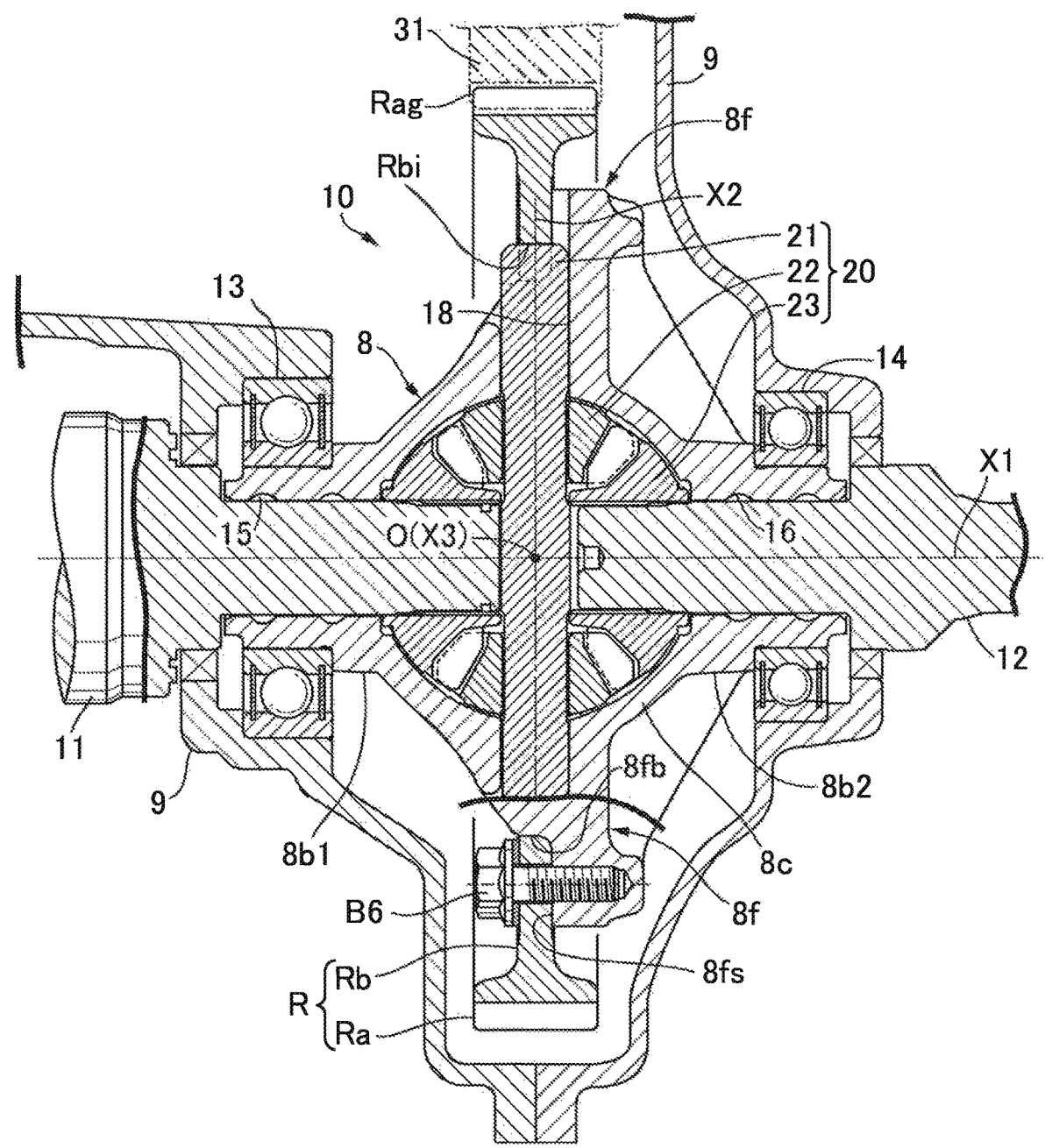
FIG. 1 is a longitudinal sectional view showing a differential device related to one embodiment of the present invention and peripheral equipment thereof (a sectional view along line 1-1 in FIG. 2).

B1 to B8 Bolt (joining part)
B1, B4, B5, B8 specific bolt (specific joining part)
10 Differential device
H Working window
Hi Inner window portion
Hie Inner end part
Ho Outer window portion
Hoe Outer end part
L1, L2 Imaginary straight line, bisector
R Ring gear
Rag Tooth part
X1, X2, X3 First axis, second axis, third axis
8 Differential case
8c Case main body
8f Flange portion
20 Differential mechanism
21 Pinion shaft
22 Pinion gear
23 Side gear
31 Drive gear

MODES FOR CARRYING OUT THE INVENTION

An embodiment of the present invention is explained below by reference to the attached drawings.

In FIG. 1, housed within a transmission case 9 of a vehicle (e.g. an automobile) is a differential device 10 that distributes and transmits power from a power source (e.g. a vehicle-mounted engine), which is not illustrated, between left and right axles 11 and 12. The differential device 10 includes a differential case 8 and a differential mechanism 20 installed within the differential case 8.

The differential case 8 includes a hollow case main body 8c that is formed into a substantially spherical shape and houses the differential mechanism 20 in its interior, as well as first and second bearing bosses 8b1 and 8b2 that are integrally and connectedly provided on a right-hand side part and a left-hand side part of the case main body 8c and arranged on a first axis X1.

The differential case 8 further includes a flange portion 8f that is integrally formed on an outer peripheral part of the case main body 8c so as to face outward in the radial direction, and this flange portion extends in a circumferential direction with the first axis X1 as a center. The first and second bearing bosses 8b1 and 8b2 are supported on the transmission case 9 via bearings 13 and 14 on the outer peripheral side of the bosses 8b1 and 8b2 so that they can rotate around the first axis X1.

Figure 4:
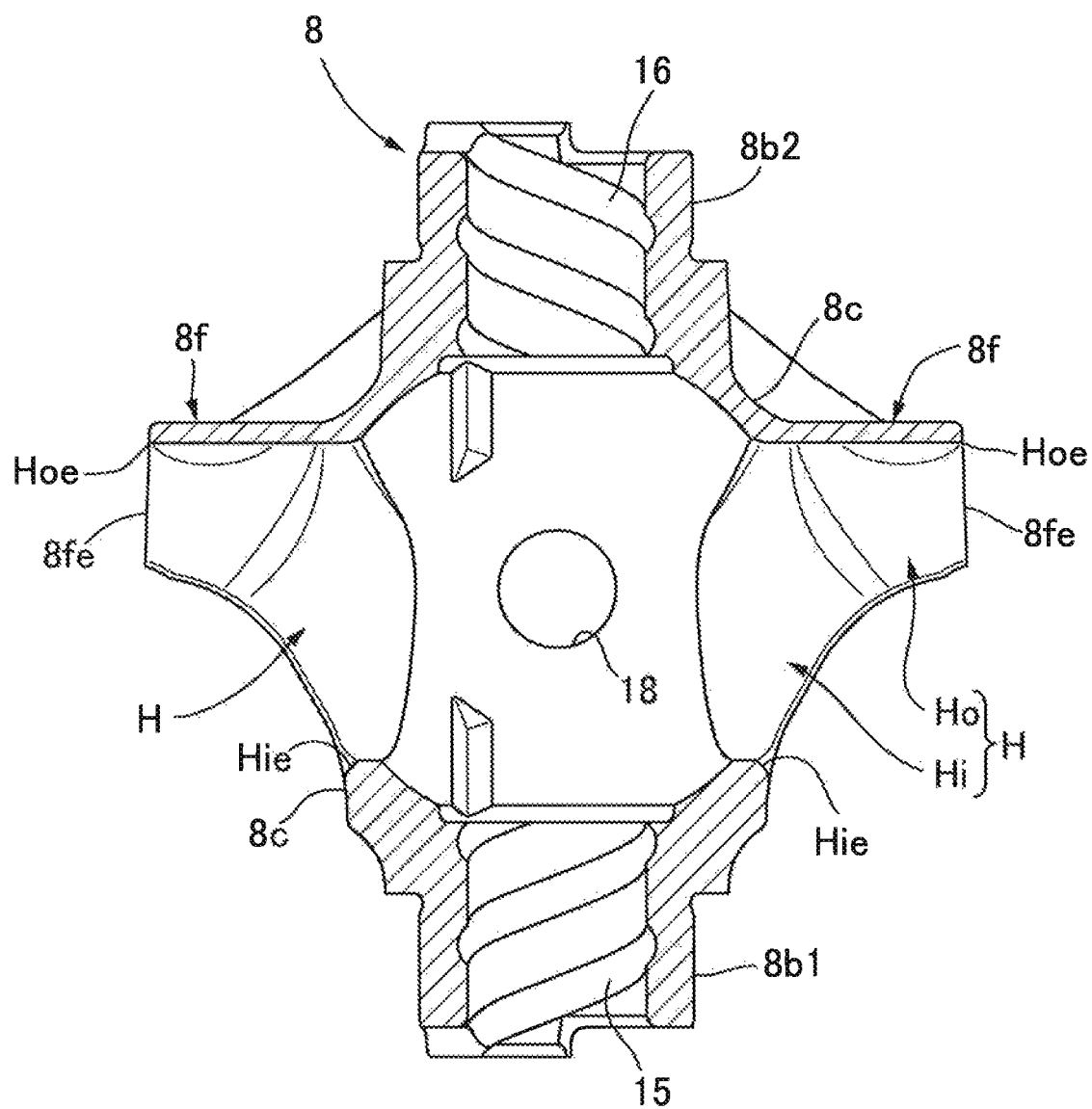
FIG. 4 is a sectional view along line 4-4 in FIG. 3.
Figure 5:
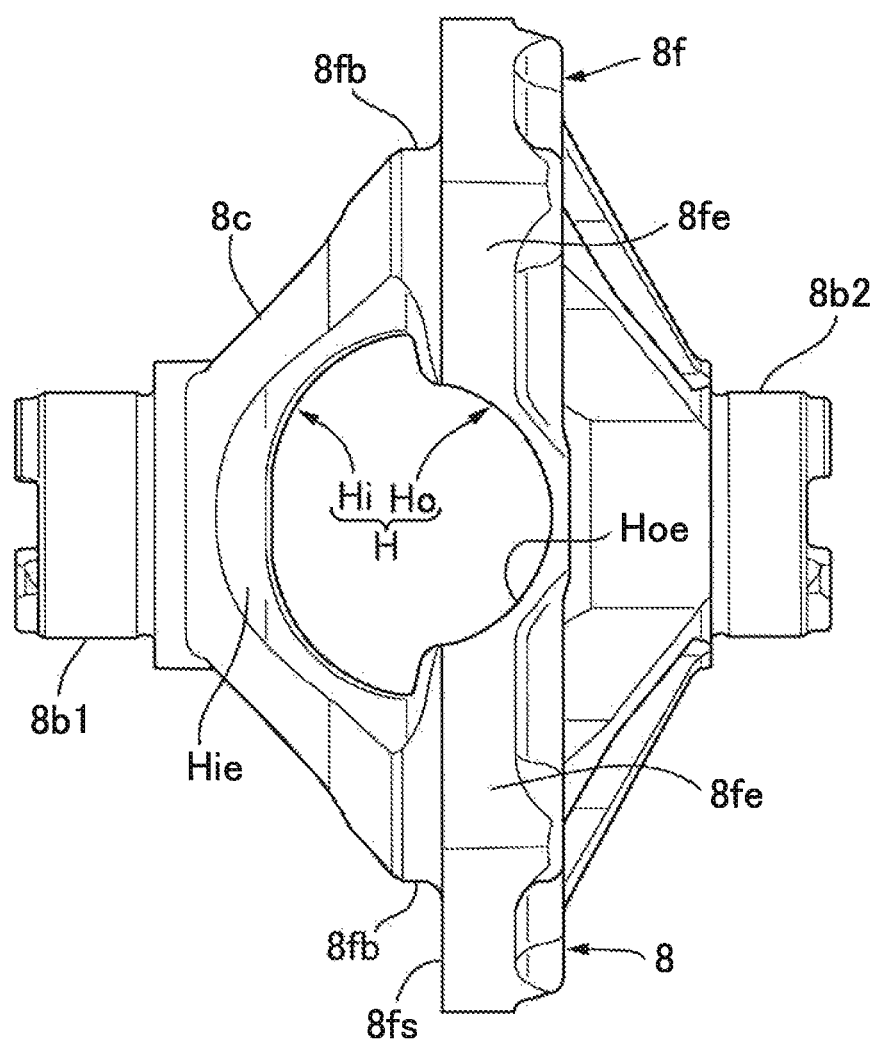
FIG. 5 is a view in the direction of arrow 5 in FIG. 3.
Figure 6:
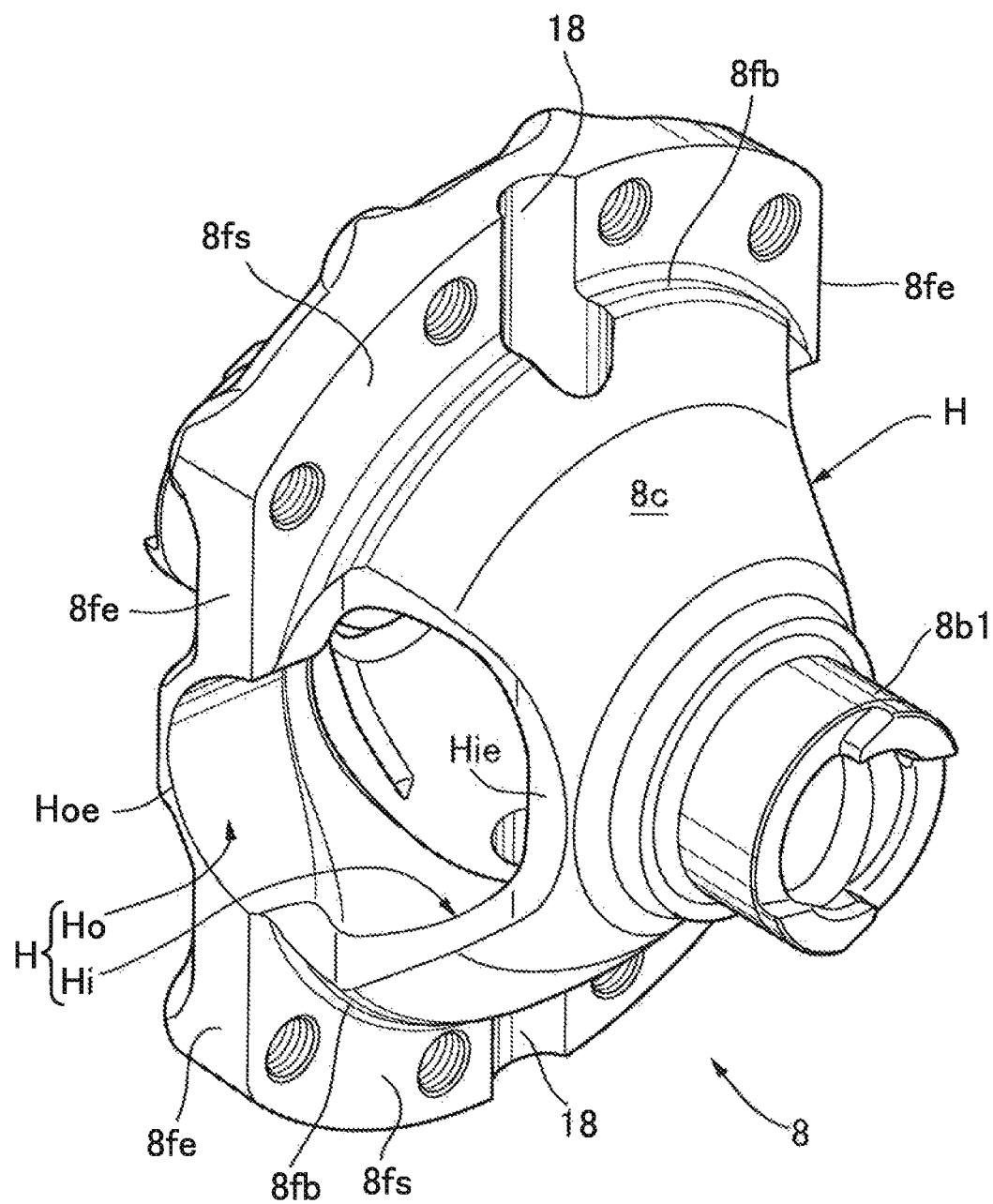
FIG. 6 is a perspective view of the differential case on its own (perspective view viewed from arrow 6 in FIG. 3).

Furthermore, the left and right axles (drive shafts) 11 and 12 are rotatably fitted into inner peripheral faces of the first and second bearing bosses 8b1 and 8b2, and helical grooves 15 and 16 for drawing in lubricating oil (see FIG. 4) are provided inside of the bearing bosses. The helical grooves 15 and 16 can exhibit a screw pump action of feeding lubricating oil within the transmission case 9 into the differential case 8, accompanying rotation of the bearing bosses 8b1 and 8b2 with the differential case 8, and relative to the respective axles 11 and 12.

A ring gear R is fastened to the flange portion 8f by means of a plurality of bolts B1 to B8, which are described later. The ring gear R includes a rim Ra having a helical gear (bevel gear)-shaped tooth part Rag on its outer periphery, and a ring plate-shaped spoke Rb protruding integrally from an inner peripheral face of the rim Ra, the tooth part Rag meshing with a drive gear 31, which is an output part of a transmission device connected to the engine.

The spoke Rb is fastened to the flange portion 8f by means of a plurality of bolts (that is, joining parts) B1 to B8 in a state in which one face of the spoke Rb abuts against one side face 8fs (a side face on the first bearing boss 8b1 side) of the flange portion 8f and an inner peripheral face thereof is fitted onto an arc-shaped support face 8fb of the flange portion 8f.

The bolts B1 to B8 are disposed side by side at intervals in the peripheral direction of the flange portion 8f, extend through the spoke Rb, and are screwed into the flange portion 8f. In FIG. 1, the tooth part Rag is displayed as a cross section along the tooth line in order to simplify the display.

Due to having the helical gear-shaped tooth part Rag the ring gear R meshes with the drive gear 31, which similarly has a helical gear-shaped tooth part, and receives a thrust load (a component in the thrust direction of a meshing reaction force) in a direction along the first axis X1, and this thrust load is received by the case main body 8c from the ring gear R via the flange portion 8f.

The differential mechanism 20 includes a pinion shaft 21 disposed on a second axis X2 that is orthogonal to the first axis X1 at a center O of the case main body 8c, a pair of pinion gears 22 and 22 rotatably supported on the pinion shaft 21, and left and right side gears 23 and 23 meshing with the respective pinion gears 22. The left and right side gears 23 and 23 function as output gears of the differential mechanism 20, and inner end parts of the left and right axles 11 and 12 are each spline fitted into inner peripheral faces of the side gears 23 and 23.

Back faces of the pinion gear 22 and the side gear 23 are each rotatably supported by an inner face of the case main body 8c. In the present embodiment, the inner face of the case main body 8c is illustrated as being spherical, but it may be a tapered face or a flat face orthogonal to the first axis X1 or the second axis X2. The pinion shaft 21 is made to extend through and be retained by a pair of support holes 18 formed so as to straddle an outer peripheral end part of the case main body 8c and the flange portion 8f and extending on the second axis X2. In a state in which the pinion shaft 21 is joined to the flange portion 8f of the ring gear R, opposite ends of the pinion shaft 21 are engaged with an engagement recess Rbi provided in an inner peripheral face of the spoke Rb of the ring gear R, thus preventing it from disengaging from the support hole 18. Due to the pinion shaft 21 being thus engaged with the engagement recess Rbi of the ring gear R, the pinion shaft 21 and the ring gear R are linked in the rotational direction, the torque transmitted from the ring gear R is therefore transmitted directly to the pinion shaft 21, and the burden on the differential case 8 can accordingly be lightened. A small amount of play may be set in a part via which the pinion shaft 21 is fitted into the support hole 18.

A rotational driving force, transmitted from the drive gear 31 to the ring gear R, is distributed between the left and right axles 11 and 12 via the differential mechanism 20, while allowing differential rotation and being further transmitted outwardly by the axles, and since the function of the differential mechanism 20 in distributing power is conventionally known, further explanation is omitted.

Figure 2:
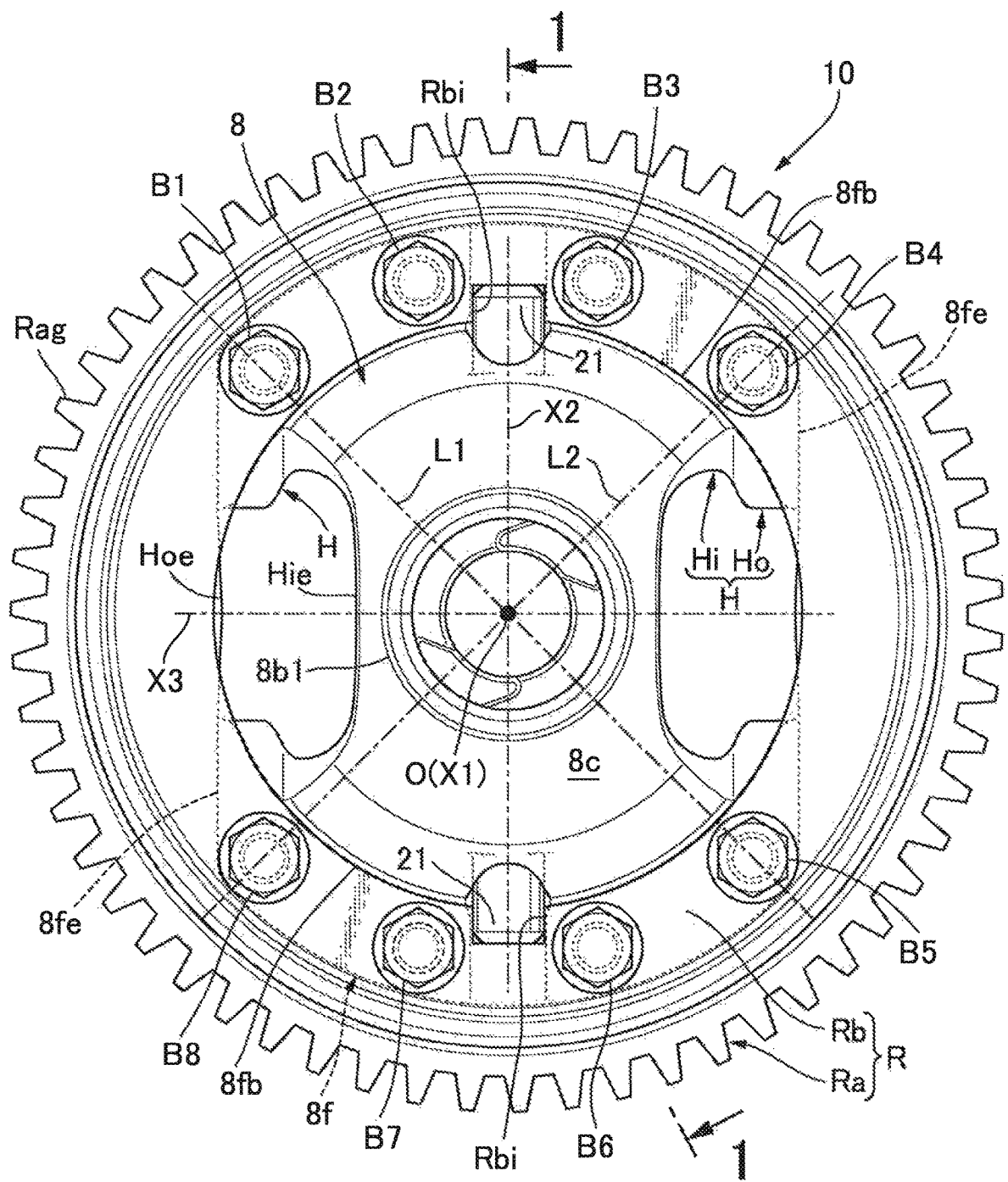
FIG. 2 is a left side view of the differential device that omits showing a transmission case, an axle, a bearing and a gear of a differential mechanism.
Figure 3:
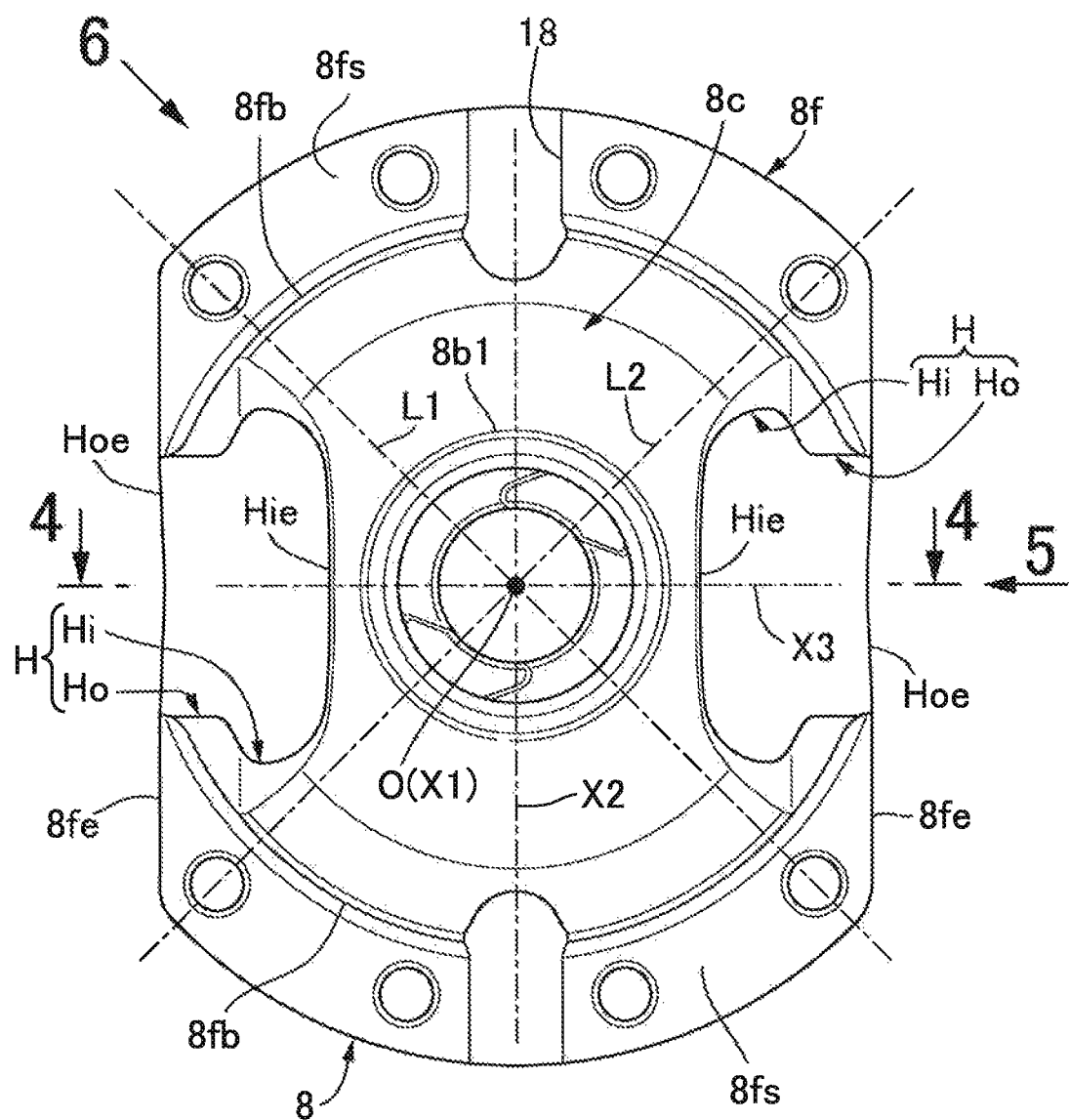
FIG. 3 is a left side view showing the differential case of the differential device on its own (view corresponding to FIG. 2).

As shown in FIG. 2 to FIG. 6, the differential case 8 has a pair of working windows H in a side wall of the case main body 8c further on the first bearing boss 8b1 side than the flange portion 8f. The pair of working windows H are disposed on both sides of the second axis X2 when viewed on a projection plane orthogonal to the first axis X1 (see FIG. 2 to FIG. 4); in other words, they are formed in the side wall of the case main body 8c so as to be arranged side by side on a third axis X3 that is orthogonal to the first and second axes X1 and X2 with the first bearing boss 8b1 sandwiched therebetween. Viewing on the projection plane can, alternatively, be described as viewing in a direction along the first axis X1, as depicted in FIGS. 2 and 3.

Each of the working windows H extends, as is clearly shown in FIG. 2 to FIG. 6, up to the outer peripheral end of the case main body 8c in a direction along the third axis X3 or a part in the vicinity thereof (up to the outer peripheral end in the present embodiment). On the other hand, the flange portion 8f is discontinued in the peripheral direction of the differential case 8 at a position corresponding to an outer end part Hoe, in a direction along the third axis X3, of the working window H. An end face 8fe in the peripheral direction of the discontinued flange portion 8f is formed on a plane substantially orthogonal to the third axis X3 in the present embodiment.

The working window H may be disposed only on one side of the second axis X2 when viewed on the projection plane.

In the present embodiment, among the plurality of bolts (that is, joining parts) B1 to B8 joining the flange portion 8f and the ring gear R, a specific bolt (that is, a specific joining part) B1, B4, B5 or B8 that is the closest to the working window H when viewed on the projection plane is disposed so as to be positioned further outward than an inner end part Hie of the working window H in a direction along the third axis X3. Moreover, the working window H is disposed so as to be positioned further outward in a direction along the third axis X3 than imaginary straight lines L1 and L2 joining the specific bolts (that is, the specific joining parts) B1, B4, B5 and B8 and the first axis X1 when viewed on the projection plane.

Furthermore, the working window H has an outer window portion Ho close to the outer end part Hoe of the working window H when viewed on the projection plane, and an inner window portion Hi that is present further inward in the direction along the third axis X3 than the outer window portion Ho, and in particular, in the present embodiment, the outer window portion Ho is formed so as to be narrower in a direction along the second axis X2 than the inner window portion Hi (see FIG. 3). When assembling the differential mechanism 20 onto the differential case 8, the pinion gear 22 and the side gear 23 can be fitted into the differential case 8 through the inner window portion Hi, which is particularly wide, without difficulty.

Moreover, in the present embodiment, when viewed on the projection plane, the specific bolts (that is, the specific joining parts) B1, B4, B5 and B8 are disposed on bisectors L1 and L2 of a region, sandwiched between the second axis X2 and the third axis X3, of the differential case 8. As another embodiment of the present invention, although not illustrated, when viewed on the projection plane, a specific bolt (that is, specific joining part) B1, B4, B5 or B8 can be disposed closer to the third axis X3 than the bisectors L1 and L2.

The operation of the embodiments is now explained.

The entire differential case 8 may be formed integrally (e.g. by casting) from a metal material (e.g. aluminum, an aluminum alloy, cast iron, etc.), and each part of the differential case 8 is appropriately subjected to machining after being integrally formed.

When assembling the differential device 10, the pinion gear 22 and the side gear 23 of the differential mechanism 20 are first fitted into the case main body 8c of the differential case 8 through the working window H, and the pinion shaft 21 is then inserted into the support hole 18. Subsequently, one side and an inner peripheral face of the spoke Rb of the ring gear R are made to abut against the one side face 8fs and the support face 8fb of the flange portion 8f of the differential case 8, and the ring gear R and the flange portion 8f are fastened together by means of the bolts B1 to B8. In this fastened state, the pinion shaft 21 is engaged with the inner peripheral face of the spoke Rb via its opposite ends, thus preventing it from falling out from the support hole 18.

The first and second bearing bosses 8b1 and 8b2 of the differential case 8 housing the differential mechanism 20 are rotatably supported on the transmission case 9 via the bearings 13 and 14 and, furthermore, inner end parts of the left and right axles 11 and 12 are inserted into the first and second bearing bosses 8b1 and 8b2 and spline fitted into inner peripheries of the left and right side gears 23 and 23, thus completing assembly of the differential device 10 onto an automobile.

While torque is being transmitted between the drive gear 31 and the ring gear R, a thrust load in a direction along the first axis X1 acts on the ring gear R, whose tooth part Rag is helical, and the orientation of the load is switched over in response to switching the automobile between forward and reverse. When a leftward thrust load in FIGS. 1 and 5 acts on the ring gear R, a thrust load in the same orientation is transmitted from the ring gear R to the flange portion 8f of the differential case 8, and the thrust load is mainly transmitted to a large diameter part of the case main body 8c via the plurality of bolts (joining parts) B1 to B8 for joining the ring gear and via the flange portion 8f, further transmitted to a small diameter part (first bearing boss 8b1) side, and finally received by the transmission case 9.

In the differential device 10 of the present embodiment, when viewed on a projection plane orthogonal to the rotational axis of the differential case 8, that is, the first axis X1, among the plurality of bolts (that is, joining parts) B1 to B8 joining the ring gear R and the flange portion 8f of the differential case 8, the specific bolts (that is, specific joining parts) B1, B4, B5 and B8 closest to the working window H are positioned further outward than the inner end part Hie of the working window H in a direction along the third axis X3, which is orthogonal to the first and second axes X1 and X2. Since the specific bolts B1, B4, B5 and B8 can thereby be disposed as close to the outside as possible with respect to the inner end part Hie of the working window H, the gap between specific bolts B1 and B8 (B4 and B5) sandwiching the working window H in the peripheral direction (that is, the span of the differential case 8 supporting a portion, corresponding to the working window H, of the ring gear R) can be made relatively short. As a result, it is possible to ensure the rigidity against the thrust load transmitted from the drive gear 31 to the ring gear R (that is, a load in a collapse direction that the ring gear R receives) during transmission, and the rigidity balance of the differential case 8 against collapse of the ring gear R can easily be maintained.

Moreover, the working window H of the present embodiment is disposed further outward in the direction along the third axis X3 than the imaginary straight lines L1 and L2 joining the specific bolts B1 and B8 (B4 and B5) and the first axis X1 when viewed on the projection plane. Because of this, when a thrust load transmitted from the drive gear 31 to the ring gear R during transmission is transmitted to the large diameter part of the case main body 8c via the specific bolts B1 and B8 (B4 and B5) and via the flange portion 8f and further transmitted to the small diameter part (that is, first bearing boss 8b1) side, the load transmission path is not a path that bypasses the working window H, and it becomes possible to avoid effectively a concentration of stress on the peripheral part of the working window H of the case main body 8c. It is therefore advantageous in terms of enhancing the rigidity strength of the differential case 8, and even when the differential case 8 is formed from a low strength material (e.g. aluminum, etc.) sufficient rigidity strength can be ensured.

Figure 7:
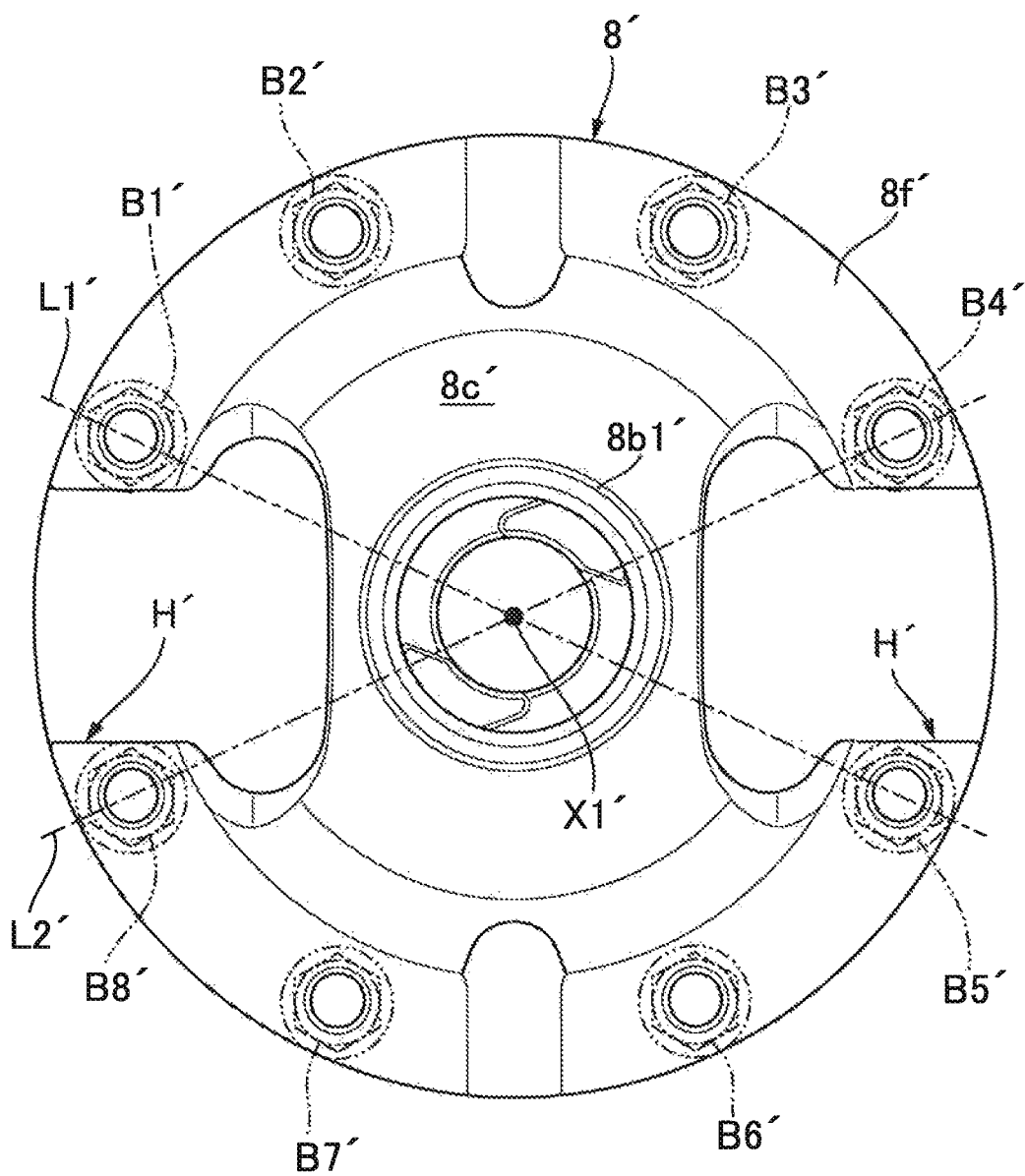
FIG. 7 is a left side view showing a differential case related to a reference example on its own (view corresponding to FIG. 3).

On the other hand, in a reference example shown in FIG. 7, the window width, in the peripheral direction of the case, of a working window H' is narrowed in the same manner as in the present embodiment; furthermore, specific bolts B1' and B8' (B4' and B5') sandwiching the working window H' are made sufficiently close to the working window H', and the gap between the specific bolts B1' and B8' (B4' and B5'), that is, the support span, is thereby shortened.

However, in the reference example of FIG. 7, since imaginary straight lines L1' and L2' joining the specific bolts B1' and B8' (B4' and B5') and a first axis X1' are disposed so as to transect the working window H' as clearly shown in FIG. 7, there are the following problems. That is, during transmission, a thrust load transmitted to a ring gear is transmitted to a large diameter part of a case main body 8c' via the specific bolts B1' and B8' (B4' and B5') and a flange portion 8f of the differential case 8' and further transmitted to a small diameter part (that is, a first bearing boss 8b1'), and in this process since the load transmission path is a path that curves so as to bypass the working window H', a concentration of stress easily occurs at a peripheral part of the working window H' of the case main body 8c'. From this point, it is clear that the present invention is superior to the reference example.

Furthermore, the working window H of the present embodiment extends up to the outer peripheral end of the case main body 8c in a direction along the third axis X3 or a part in the vicinity thereof, and the flange portion 8f is discontinued in the peripheral direction of the differential case 8 at a position corresponding to the outer end part Hoe, in the direction along the third axis X3, of the working window H, and it is therefore advantageous in terms of lightening the weight of the differential case. Also due to such lightening of the weight, any degradation of rigidity strength of the differential case 8 can be suppressed effectively by a unique arrangement of the specific bolts B1 and B8 (B4 and B5) with respect to the working window H.

Moreover, since the working window H is formed so that when viewed on the projection plane the outer window portion Ho close to the outer end part Hoe of the working window H is narrower in the direction along the second axis X2 than the inner window portion Hi connected further on the inner side than the outer window portion Ho, it is possible to extend effectively a region of the flange portion 8*f* supported by the case main body 8*c* (that is, by a portion via which the outer window portion Ho is narrowed) in the peripheral direction of the case while ensuring a sufficient overall opening area of the working window H (therefore, ensuring the ease of assembly or machining through the working window H). This enables the rigidity via which the flange portion 8*f* is supported by the case main body 8*c* to be enhanced, and it therefore becomes possible to suppress effectively collapse of the ring gear R when a thrust load is applied thereto.

Furthermore, in the present embodiment, when viewed on the projection plane, the specific bolts B1 and B8 (B4 and B5) are disposed on the bisectors L1 and L2 of the region, sandwiched between the second axis X2 and the third axis X3, of the differential case 8, or as in another embodiment, which is not illustrated, the specific bolts B1 and B8 (B4 and B5) are disposed closer to the third axis X3 than the bisectors L1 and L2. This enables the gap between the specific bolts B1 and B8 (B4 and B5) sandwiching the working window H in the peripheral direction, that is, the support span, to be further shortened, thereby enabling collapse of the ring gear R when a thrust load is applied thereto to be suppressed more effectively.

Embodiments of the present invention are explained above, but the present invention is not limited to the embodiments and may be modified in a variety of ways as long as the modifications do not depart from the subject matter.

For example, the embodiments illustrate a case in which the differential device 10 is applied to a vehicular differential device, but the present invention may be embodied by applying the differential device 10 to various types of machines and devices other than a vehicle.

Furthermore, the embodiments illustrate a case in which the flange portion 8*f* of the differential case 8 and the ring gear R are joined by means of the plurality of bolts B1 to B8, but in the present invention, joining of the flange portion 8*f* and the ring gear R may be carried out by welding (e.g. laser welding, electron beam welding, etc.). In this case, a welded portion between the flange portion 8*f* and the ring gear R is the joining part of the present invention, and among the welded portions, a specific welded portion closest to the working window H when viewed on a projection plane orthogonal to the first axis X1 is the specific joining part of the present invention.

Moreover, the embodiments illustrate a case in which the flange portion 8*f* of the differential case 8 is discontinued in the peripheral direction of the differential case 8 at a position corresponding to the outer end part Hoe, in a direction along the third axis X3, of the working window H, but in the present invention the flange portion 8*f* may be formed into an annular shape without a discontinued portion (that is, a discontinuous portion in the peripheral direction).

Furthermore, the embodiments illustrate a case in which the tooth part Rag of the ring gear R has a helical gear shape, but the ring gear of the present invention may be for example a bevel gear, a hypoid gear, etc. as long as it has at least a gear shape that receives a thrust load in a direction along the first axis X1 due to meshing with the drive gear 31.

Moreover, the embodiments illustrate a case in which the pinion shaft 21 is directly supported on the ring gear R, but in the present invention the pinion shaft 21 may be supported on the differential case 8.

The invention claimed is:

1. A differential device comprising:
a differential case formed as an integral unit, the differential case comprising a hollow case main body having at least one working window formed in a side wall thereof, a flange portion projectingly provided integrally formed with an outer periphery of the case main body, and first and second bearing bosses that are integrally provided on opposite side parts of the case main body and are configured to rotatably support left and right axles, respectively, the differential case configured to rotate around a first axis,
a differential mechanism that is housed within the case main body, and
a ring gear that is joined to the flange portion in order to transmit power from a drive gear connected to a power source to the differential case by meshing with the drive gear, the ring gear having a tooth part that receives a thrust load in a direction parallel to the first axis due to meshing with the drive gear,
the differential mechanism having a pinion shaft that is disposed on a second axis orthogonal to the first axis and is supported on the differential case or the ring gear, a pinion gear that is rotatably supported on the pinion shaft, and a pair of side gears that mesh with the pinion gear and are supported on the case main body so that they can rotate around the first axis,
wherein the at least one working window extends from the flange portion of the differential case to a portion proximate the first bearing boss, and is configured to allow insertion of the pinion gear and the side gears therethrough during assembly, and wherein the at least one working window is disposed either on one side or on opposite sides of the second axis when viewed in a direction along the first axis,
wherein when viewed in the direction along the first axis, among joining parts extending between and connecting the flange portion of the differential case and the ring gear, a specific joining part, that is the closest to the at least one working window, is positioned further outward than an inner end part of the at least one working window in a direction along a third axis orthogonal to the first and second axes, and the at least one working window is positioned further outward, in the direction along the third axis, than an imaginary straight line extending between and joining the specific joining part and the first axis,
and wherein the differential device is configured such that during use, the thrust load is transmitted from the ring gear to the differential case via the specific joining part.

2. The differential device according to claim 1, wherein the at least one working window extends to an outer peripheral end of the case main body, or a part in a vicinity thereof, in the direction along the third axis, and
the flange portion is discontinued in a peripheral direction of the differential case at a position corresponding to an outer end part, in the direction along the third axis, of the at least one working window.

3. The differential device according to claim 2, wherein when viewed in the direction along the first axis, the at least one working window is formed so that an outer window portion close to the outer end part in the direction along the third axis is narrower in a direction along the second axis than an inner window portion further inward than the outer window portion.

4. The differential device according to claim 3, wherein when viewed in the direction along the first axis, the specific joining part is disposed on a bisector of a region, sandwiched between the second axis and the third axis, of the differential case or closer to the third axis than the bisector.

5. The differential device according to claim 2, wherein when viewed in the direction along the first axis, the specific joining part is disposed on a bisector of a region, sandwiched between the second axis and the third axis, of the differential case or closer to the third axis than the bisector.

6. The differential device according to claim 1, wherein when viewed in the direction along the first axis, the at least one working window is formed so that an outer window portion, close to an outer end part in the direction along the third axis, is narrower in a direction along the second axis than an inner window portion further inward than the outer window portion.

7. The differential device according to claim 6, wherein when viewed in the direction along the first axis, the specific joining part is disposed on a bisector of a region, sandwiched between the second axis and the third axis, of the differential case or closer to the third axis than the bisector.

8. The differential device according to claim 1, wherein when viewed in the direction along the first axis, the specific joining part is disposed on a bisector of a region, sandwiched between the second axis and the third axis, of the differential case or closer to the third axis than the bisector.

* * * * *